United States Patent Office 3,165,545
Patented Jan. 12, 1965

3,165,545
S-ARYL PHOSPHORAMIDODITHIOATES
Etcyl H. Blair, Midland, Mich., assignor to The Dow Chemical Company, Midland, Mich., a corporation of Delaware
No Drawing. Filed July 9, 1962, Ser. No. 208,587
5 Claims. (Cl. 260—461)

The present invention is directed to the S-aryl phosphoramidodithioates corresponding to the formula

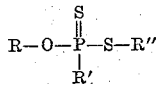

In this and succeeding formulae, R represents loweralkyl, R' represents amino or loweralkylamino, and R" represents phenyl or substituted phenyl wherein the substituents are selected from the group consisting of bromo, chloro, loweralkoxy, loweralkyl and loweralkylthio. In the present specification and claims, the expressions loweralkyl and loweralkoxy are employed to refer, respectively, to alkyl and alkoxy radicals being of from 1 to 5 carbon atoms, inclusive. These compounds are liquid or crystalline solid materials which are somewhat soluble in many common organic solvents and of very low solubility in water. The compounds are useful as parasiticides and are adapted to be employed as active toxicants in compositions for the control of mite, helminth, insect, bacterial and fungal organisms such as aphids, beetles, ticks, worms, *Rhizoctonia solani* and ascarids.

The novel compounds of the present invention are prepared by several operational procedures. Thus, the compounds are produced by reacting phosphorus thiochloride successively with (1) ammonia or a loweralkylamine, (2) a loweralkanol (ROH) and (3) a suitable mercaptan such as benzenethiol or a substituted benzenethiol wherein the substituents are selected from the group consisting of bromo, chloro, loweralkoxy, loweralkyl, and loweralkylthio. Representative mercaptans include benzenethiol, p-(ethylthio)benzenethiol, 3,4-diethoxybenzenethiol, o - bromobenzenethiol, 4-tert-butyl-2-chlorobenzenethiol, 2,6-dimethylbenzenethiol, p-butoxy-benzenethiol, o-methylbenzenethiol, 4,5-dimethoxy-2-methylbenzenethiol, pentachlorobenzenethiol, 2 - bromo-4-methoxybenzenethiol, and p-propylbenzenethiol. In such procedures, the amidation is first effect, if desired, and the amidated product thereafter successively esterified with the loweralkanol and the mercaptan. Such esterification can be first carried out with either the loweralkanol or mercaptan and the second esterification with the remaining esterifying reactant. In an alternative procedure, the phosphorus thiochloride is esterified in either order with the mercaptan and the loweralkanol and the resulting product thereafter amidated. In a further procedure, the phosphorus thiochloride is first esterified with either the loweralkanol or mercaptan, following which the resulting intermediate is first amidated and thereafter esterified with the remaining esterifying reactant. The esterification and amidation reactions are carried out in the presence of an acid binding agent or hydrogen chloride acceptor such as a tertiary amine or an alkali metal hydroxide. Representative agents include pyridine and sodium hydroxide. Conveniently, the amidation is carried out in twice the proportion of the amidating reagent, such excess of reagent being employed as the acid binding agent. In an alternative procedure, the esterification is carried out by reacting together the phosphorus thiochloride and the alkali metal salt of the alcohol or mercaptan, such as the sodium or potassium salt.

The esterification and amidation reactions are carried out in a liquid reaction medium such as diethyl ether, acetone, dimethylformamide, benzene, chlorobenzene and toluene. The reactions are somewhat exothermic and take place readily at temperatures at which chloride is produced as a product of reaction. This chloride appears in the reaction mixture as the chloride of the acid binding agent or of the metal in any employed alkali metal alcoholate or mercaptan. Following any esterification or amidation reaction, the reaction mixture conveniently is cooled and any chloride of the acid binding agent removed by filtration. The temperature of reaction can be controlled by regulating the rate of adding the esterifying or amidating reagents to the reaction zone and by external cooling. Good results are obtained when operating at temperatures of from about −10° to 80° C. and employing one molecular proportion of phosphorus thiochloride with one molecular proportion of each of the esterifying reagents and of the amidating reagent. In the esterification and amidation reactions, the acid binding agent is employed in an amount substantially equimolecular with the amount of the esterifying or amidating reagents. Upon completion of the reaction, the reaction mixture is treated by conventional procedures to separate the desired product. In one such procedure, the mixture is filtered, successively washed with water and dilute alkali metal hydroxide or alkali metal salt such as sodium carbonate, and any reaction medium removed by evaporation or fractional distillation under reduced pressure to obtain the desired product as a residue. This product is further purified by conventional methods.

In carrying out the reaction, the phosphorus thiochloride is successively reacted with the loweralkanol and mercaptan or their metal salts to produce an O-loweralkyl S-phenyl phosphorchloridodithioate intermediate. This intermediate is thereafter reacted with ammonia or loweralkylamine to produce the desired product. In an alternative procedure, the phosphorus thiochloride is amidated and thereafter reacted with a loweralkanol or its metal salt to produce an O-loweralkyl phosphoramidochloridothioate intermediate. This intermediate is then esterified with the mercaptan or its metal salt to produce the desired product. In a similar procedure, the order of esterification is reversed to produce an S-phenyl phosphoramidochloridodithioate intermediate which is subsequently esterified with a loweralkanol or its metal salt to produce the desired product. In a further procedure, the phosphorus thiochloride is esterified with the loweralkanol or its metal salt and the resulting product amidated to produce an O-loweralkyl phosphoramidochloridothioate intermediate. This intermediate is subsequently esterified with the mercaptan or its metal salt to produce the desired product. In a similar procedure, the first esterification is carried out with the mercaptan or its salt to produce an S-phenyl phosphoramidochloridodithioate which is subsequently esterified with the alcohol or its salt.

In a preferred procedure, the compounds of the present invention are prepared by reacting together the alkali metal salt of the mercaptan and an O-loweralkyl phosphoramidochloridothioate intermediate. This intermediate can be prepared by esterifying phosphorus thiochloride with a suitable alcohol or its metal salt to obtain an O-loweralkyl phosphorodichloridothioate which is thereafter amidated to yield the desired intermediate. This intermediate can also be prepared by amidating the phosphorus thiochloride and thereafter reacting the resulting product with an alcohol or its metal salt to produce the O-loweralkyl phosphoramidochloridothioate intermediate.

The following examples merely illustrate the invention and are not to be construed as limiting.

*Example I.—O-Isopropyl S-p-Tert-Bultylphenyl Isopropylphosphoramidodithioate*

Two moles of isopropylamine are added portionwise with stirring at a temperature of from 0° to 3° C. to one mole of O-isopropyl phosphorodichloridothioate dispersed in 1.5 liters of methylene chloride. The addition is carried out over a period of two hours. The reaction mixture is then filtered and the filtrate washed with water and subsequently distilled under reduced pressure to separate the O-isopropyl isopropylphosphoramidochloridothioate as a pale yellow oil.

Sodium (2.3 grams; 0.1 mole) and 16.6 grams (0.1 mole) of p-tert-butylbenzenethiol are reacted together in 100 milliliters of absolute ethanol to produce the sodium salt of p-tert-butylbenzenethiol. O-isopropyl isopropylphosphoramidochloridothioate (21.6 grams; 0.1 mole) is added portionwise with stirring to the above sodium salt mixture. The addition is carried out over a period of thirty minutes and at a temperature of from 12° to 17° C. Stirring is thereafter continued for forty minutes and the temperature maintained at the same 12° to 17° C. range. Subsequently the reaction mixture is heated for a period of one hour to a temperature of about 45° C. to complete the reaction. The reaction mixture is then cooled to room temperature, the cooled mixture diluted with 100 milliliters of methylene chloride and the diluted mixture washed with 300 milliliters of water and dried over anhydrous calcium sulfate (Drierite). The solvent medium is removed from the dried reaction mixture by fractional distillation under subatmospheric pressure to obtain the O-isopropyl S-p-tert-butylphenyl isopropylphosphoramidothioate product as a residue. This product is found to be a liquid material having a refractive index $n/D$ of 1.5020 at 25° C.

*Example II.—O-Methyl S-p-Bromophenyl Methylphosphoramidodithioate*

Sodium (2.5 grams; 0.1 mole) is reacted with p-bromobenzenethiol in a mixture comprising 500 milliliters of toluene and 100 milliliters of diethyl ether. The resulting mixture is stirred at room temperature for one hour to complete the preparation of the sodium salt of p-bromobenzenethiol. O-methyl methylphosphoramidochloridothioate (0.16 gram; 0.10 mole) is added rapidly portionwise at room temperature and with stirring to the above prepared mixture containing the sodium salt. The resulting reaction mixture is stirred for one hour at room temperature and subsequently permitted to stand for about twelve hours at room temperature to complete the reaction. The reaction mixture is then washed with water and the reaction medium thereafter removed from the washed product by fractional distillation under reduced pressure to obtain the O-methy S-p-bromophenyl methylphosphoramidodithioate product as a residue. This product is found to be a light yellow liquid having a refractive index $n/D$ of 1.6148 at 25° C.

*Example III.—O-Isopropyl S-p-Chlorophenyl Methylphosphoramidodithioate*

Sodium (2.3 grams; 0.1 mole) is mixed with p-chlorobenzenethiol (14.4 grams; 0.1 mole) in 300 milliliters of toluene to prepare a mixture containing the sodium salt of p-chlorobenzenethiol. O-isopropyl methylphosphoramidochloridothioate (18.7 grams; 0.1 mole) is added rapidly portionwise to the above prepared salt mixture with stirring. The mixture is then heated for one hour at about 50° C., and subsequently cooled to room temperature. The reaction mixture is then washed with water, and the reaction medium removed from the washed product by distillation under reduced pressure to obtain the O-isopropyl S-p-chlorophenyl methylphosphoramidodithioate product as a residue. This product is found to be a pale yellow oil having a refractive index $n/D$ of 1.5765 at 25° C., a density of 1.2220 at 25° C., and a nitrogen content of 4.58 percent as compared to a theoretical nitrogen content of 4.75 percent.

*Example IV—O-Isopropyl-S-Phenyl Isopropyl-Phosphoramidodithioate*

Sodium (2.3 grams; 0.1 mole) is reacted with benzenethiol (11grams; 0.1 mole) in 300 milliliters of toluene to prepare a mixture containing the sodium salt of benzenethiol. O - isopropyl isopropylphosphoramidochloridothioate (21.6 grams; 0.1 mole) is added portionwise with stirring to the salt mixture. The addition is carried out at room temperature. Stirring is thereafter continued and the mixture heated to 50° C. and maintained thereat for one hour. The reaction mixture is then washed with water, and the solvent removed from the washed mixture by vacuum distillation to obtain the O-isopropyl S-phenyl isopropylphosphoramidodithioate product as a residue. This product is found to be a yellow oil having a refractive index of 1.5545, and a nitrogen content of 4.71 percent as compared with a theoretical nitrogen content of 4.84 percent.

Other S-aryl phosphoramidodithioates are similarly prepared in excellent yields and in the following manner.

O-pentyl S-2,4,5-trichlorophenyl phosphoramidodithioate (molecular weight of 378.7) by reacting together the sodium salt of 2,4,5-trichlorobenzenethiol and O-pentyl phosphoramidodchloridothioate.

O-methyl S-p-tert-butylphenyl methylphosphoramidodithioate ($n/D$ of 1.5584 at 25° C.) by reacting together the sodium salt of p-tert-butylbenzenethiol and O-methyl methylphosphoramidochloridothioate.

O-isobutyl S-2-bromo-4-chlorophenyl sec-butyl-phosphoramidodithioate (molecular weight of 430.8) by successively reacting phosphoryl thiochloride with the sodium salt of 2-bromo-4-chlorobenzenethiol, the sodium salt of isobutyl alcohol, and sec-butylamine.

O-butyl S-4,5-dimethoxy-o-tolyl phosphoramidodithioate (molecular weight of 335.4) by reacting together the sodium salt of 4,5-dimethoxy-o-toluenethiol and O-butyl phosphoramidochloridothioate.

O - methyl S-phenyl methylphosphoramidodithioate ($n/D$ of 1.6088 at 25° C.) by reacting together the sodium salt of benzenethiol and O-methyl methylphosphoramidochloridothioate.

O-ethyl S - 2-chloro-4-(methylthio)phenyl ethylphosphoramidodithioate (molecular weight of 325.9) by successively reacting phosphoryl thiochloride with ethylamine, the sodium salt of ethyl alcohol, and the sodium salt of 2-chloro-4-(methylthio)benzenethiol.

O-ethyl S-pentachlorophenyl propylphosphoramidodithioate (molecular weight of 447.6) by reacting together the sodium salt of pentachlorobenzenethiol and O-ethyl propylphosphoramidochloridothioate.

O-propyl S-p-(pentylthio)phenyl pentylphosphoramidodithioate (molecular weight of 419.7) by reacting together the sodium salt of p-(pentylthio)benzenethiol and O-propyl pentylphosphoramidochloridothioate.

O - methyl S-p-chloropenyl methylphosphoramidodithioate (melting at 45°–46° C. and having a nitrogen content of 5.20 percent as compared with a theoretical nitrogen content of 5.23 percent) by reacting together the sodium salt of p-chlorobenzenethiol and O-methyl methylphosphoramidochloridothioate.

O - sec-butyl S-4-tert-butyl-2-chlorophenyl butylphosphoramidodithioate (molecular weight of 408.0) by reacting together the sodium salt of 4-tert-butyl-2-chlorobenzenethiol and O-sec-butyl buytlphosphoramidochloridothioate.

O-ethyl S-2,4,6-trimethylphenyl phosphoramidodithioate (molecular weight of 275.4) by reacting together the sodium salt of 2,4,6-trimethylbenzenethiol and O-ethyl phosphoramidochloridothioate.

The new compounds of the present invention have been found to be useful as herbicides and parasiticides for the control of a number of plants, mite, insect, and bacterial and fungal organisms. For such use, the products can be dispersed on a finely divided solid and employed as dusts. Also, such mixtures can be dispersed in water with said aid of a wetting agent and the resulting aqueous suspensions employed as sprays. In other procedures, the products can be employed as constituents of organic liquid compositions, oil-in-water or water-in-oil emulsions or water dispersions with or without the addition of wetting, dispersing or emulsifying agents. In representative operations, aqueous compositions containing 50 parts per million by weight of O-methyl S-p-chlorophenyl methylphosphoramidodithioate give 100 percent controls of Mexican bean beetle and Two spotted spider mite.

The substituted benzenethiols to be employed as starting materials according to the present invention are prepared in known methods by the reaction of the corresponding substituted benzene compounds and chlorosulfonic acid to prepare the intermediate substituted benzene-chlorosulfonate. This intermediate is then treated with zinc in the presence of hydrogen to yield the desired benzenethiols. In an alternative procedure, certain of the starting materials can be conveniently prepared in known procedures wherein poly(loweralkylthio) benzenes are treated with alkali metal in liquid ammonia to cleave therefrom one of the loweralkyl groups. A summary of various such methods is found in the Journal of the American Chemical Society, volume 75, page 6019, and the references there cited. Others are identified in "Organic Chemistry of Bivalent Sulfur" (Chemical Publishing Company, New York, 1958), volume 1, page 71, the tabulation of "Properties of Some Aromatic Mercaptans" and the references (see pages 75–106) there listed.

The substituted benzenes employed in accordance with the present teachings are prepared in known procedures of halogenation, alkylation and etherification of benzene or phenol, or suitable substitution products thereof with halogen, alkyl halides or alkanols. Alkylthiobenzenes are conveniently prepared by known condensation operations wherein halobenzenes or halophenols or suitable substitution products thereof are condensed with alkyl mercaptans at somewhat elevated temperatures and in the presence of a nitrogenous base. Following the reaction, the desired product is separated by fractional distillation.

I claim:
1. A compound of the formula

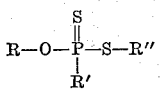

wherein R represents loweralkyl, R' represents a member of the group consisting of amino and loweralkylamino, and R'' represents a member of the group consisting of phenyl and substituted phenyl in which the substituents are selected from the group consisting of bromo, chloro, loweralkoxy, loweralkyl, and loweralkylthio.

2. O-isopropyl S-p-chlorophenyl methylphosphoramidodithioate.

3. O - isopropyl S - phenyl isopropylphosphoramidodithioate.

4. O-methyl S-phenyl methylphosphoramidodithioate.

5. O-methyl S-p-chlorophenyl methylphosphoramidodithioate.

References Cited in the file of this patent

UNITED STATES PATENTS

| | | |
|---|---|---|
| 2,552,540 | Drake et al. | May 115, 1951 |
| 2,552,541 | Drake et al. | May 15, 1951 |
| 2,552,574 | Moyle et al. | May 15, 1951 |
| 2,894,019 | Maeder | July 7, 1959 |
| 2,908,605 | Beriger et al. | Oct. 15, 1959 |
| 2,967,884 | Dunn et al. | Jan. 10, 1961 |
| 2,977,382 | Millikan | Mar. 28, 1961 |
| 2,978,479 | Kayser et al. | Apr. 4, 1961 |
| 3,056,825 | Schegk et al. | Oct. 2, 1962 |
| 3,072,702 | Senkbeil | Jan. 8, 1963 |

FOREIGN PATENTS

| | | |
|---|---|---|
| 885,176 | Germany | Aug. 3, 1953 |

OTHER REFERENCES

Bianchetti: "Chem. Abst.," vol. 52, col. 11769 (1958).